(12) United States Patent
Kogure (10) Patent No.: US 9,219,834 B2
(45) Date of Patent: Dec. 22, 2015

(54) IMAGE FORMING APPARATUS CAPABLE OF TRANSMITTING REPAIR REQUEST, METHOD OF CONTROLLING THE SAME, AND STORAGE MEDIUM

(71) Applicant: CANON KABUSHIKI KAISHA, Tokyo (JP)

(72) Inventor: Takeshi Kogure, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/557,686

(22) Filed: Dec. 2, 2014

(65) Prior Publication Data
US 2015/0156350 A1 Jun. 4, 2015

(30) Foreign Application Priority Data
Dec. 4, 2013 (JP) .................................. 2013-251139

(51) Int. Cl.
*H04N 1/00* (2006.01)
(52) U.S. Cl.
CPC ....... *H04N 1/00344* (2013.01); *H04N 1/00114* (2013.01); *H04N 1/00408* (2013.01); *H04N 2201/0094* (2013.01)
(58) Field of Classification Search
CPC .................. H04N 1/00344; H04N 1/00114
USPC ................................ 358/1.1–3.29, 1.11–1.18
See application file for complete search history.

(56) References Cited

U.S. PATENT DOCUMENTS

| 2010/0017673 | A1* | 1/2010 | Lu et al. | 714/749 |
| 2010/0020361 | A1* | 1/2010 | Kim et al. | 358/406 |
| 2013/0114100 | A1* | 5/2013 | Torii et al. | 358/1.14 |

FOREIGN PATENT DOCUMENTS

JP 2011150588 A 8/2011

* cited by examiner

*Primary Examiner* — Marcellus Augustin
(74) *Attorney, Agent, or Firm* — Rossi, Kimms & McDowell LLP (57) ABSTRACT

An image forming apparatus that prompts, when instructed by a user to transmit a repair request, the user to perform repair work before it actually transmits the repair request to an external apparatus. A console section receives an instruction for transmitting a repair request for repairing the image forming apparatus to the external apparatus from a user. Upon receipt of the instruction, the console section displays an operation screen indicating a repair operation that the user should perform. When the display unit displays the operation screen and the console section receives from the user the instruction for transmitting the repair request to the external apparatus again, a CPU causes the repair request to be transmitted to the external apparatus.

8 Claims, 12 Drawing Sheets

IMAGE FORMING APPARATUS CAPABLE OF TRANSMITTING REPAIR REQUEST, METHOD OF CONTROLLING THE SAME, AND STORAGE MEDIUM

BACKGROUND OF THE INVENTION

1. Field of the Invention

The present invention relates to an image forming apparatus capable of transmitting a repair request, a method of controlling the same, and a storage medium.

2. Description of the Related Art

There has been proposed an image forming apparatus which has a function of notifying a manufacturer or the like of a request for repairing a malfunction according to an instruction from a user, when the malfunction occurs in the image forming apparatus. Japanese Patent Laid-Open Publication No. 2011-150588 discloses transmitting a repair request to a management apparatus, and cancelling the repair request transmitted to the management apparatus.

There are various causes of malfunctions occurring in the image forming apparatus. Some of the malfunctions can be solved by the user who performs repair work. In the case of the image forming apparatus disclosed in Japanese Patent Laid-Open Publication No. 2011-150588, even if a malfunction can be easily solved by repair work by the user, an instruction by the user for transmitting a repair request causes the repair request to be transmitted to a management apparatus without exception. Therefore, wasteful costs can be produced for both the user and the manufacturer which repairs the image forming apparatus.

SUMMARY OF THE INVENTION

The present invention provides an image forming apparatus that prompts, when instructed by a user to transmit a repair request, the user to perform repair work before the image forming apparatus actually transmits the repair request to an external apparatus, a method of controlling the image forming apparatus, and a storage medium.

In a first aspect of the present invention, there is provided image forming apparatus that is capable of communicating with an external apparatus via a network, comprising a reception unit configured to receive from a user an instruction for transmitting a repair request for repairing the image forming apparatus to the external apparatus, a display unit configured to display an operation screen indicating a repair operation that the user should perform, when the reception unit has received the instruction, and a transmission unit configured to transmit the repair request to the external apparatus, when the display unit displays the operation screen, and also the reception unit has received from the user the instruction for transmitting the repair request to the external apparatus again.

In a second aspect of the present invention, there is provided a method of controlling an image forming apparatus that is capable of communicating with an external apparatus via a network, comprising receiving from a user an instruction for transmitting a repair request for repairing the image forming apparatus to the external apparatus, displaying an operation screen indicating a repair operation that the user should perform, when the instruction is received by said receiving, and transmitting the repair request to the external apparatus, when the operation screen is displayed by said displaying, and also the instruction for transmitting the repair request to the external apparatus is received from the user by said receiving again.

In a third aspect of the present invention, there is provided a non-transitory computer-readable storage medium storing a computer-executable program for executing a method of controlling an image forming apparatus that is capable of communicating with an external apparatus via a network, wherein the method comprises receiving from a user an instruction for transmitting a repair request for repairing the image forming apparatus to the external apparatus, displaying an operation screen indicating a repair operation that the user should perform, when the instruction is received by said receiving, and transmitting the repair request to the external apparatus, when the operation screen is displayed by said displaying, and also the instruction for transmitting the repair request to the external apparatus is received from the user by said receiving again.

According to the present invention, when an instruction for transmitting a repair request is received from the user, it is possible to prompt the user to perform repair work before the repair request is actually transmitted to an external apparatus.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
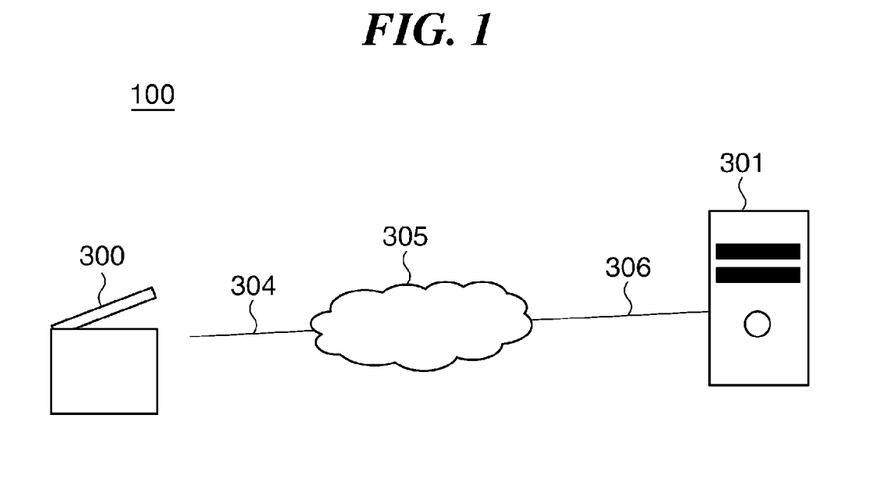
FIG. 1 is a schematic diagram of an image forming system including an image forming apparatus according to an embodiment of the present invention.

FIG. 1 is a schematic diagram of an image forming system 100 including an image forming apparatus 300 according to an embodiment of the present invention.

Referring to FIG. 1, the image forming system 100 is comprised of the image forming apparatus 300 and a management apparatus 301.

The image forming apparatus 300 is connected to the Internet 305 via a network 304, and the management apparatus 301 is connected to the Internet 305 via a network 306, whereby the image forming apparatus 300 and the management apparatus 301 are capable of communicating with one another.

The image forming apparatus 300 is capable of transmitting a repair request to the management apparatus 301 that receives repair requests. Upon receipt of the repair request from the image forming apparatus 300, the management apparatus 301 makes arrangements for repair of the image forming apparatus 300.

Figure 2:
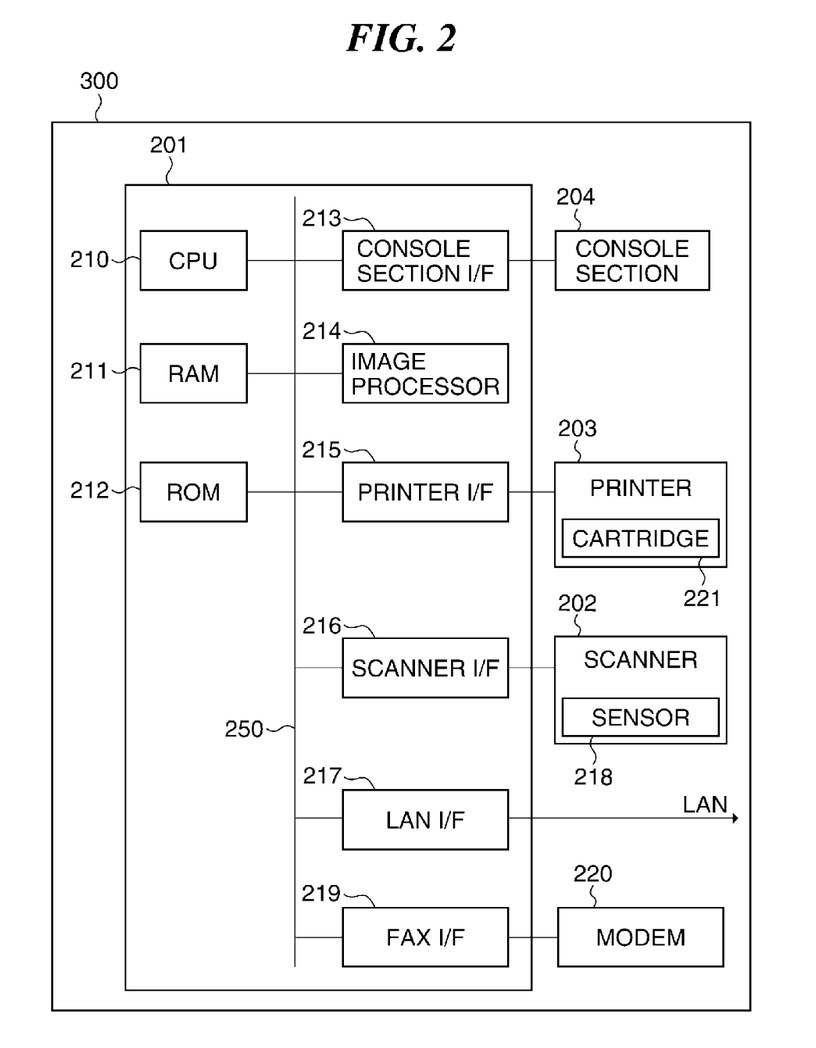
FIG. 2 is a block diagram of the image forming apparatus appearing in FIG. 1.

FIG. 2 is a block diagram of the image forming apparatus 300 appearing in FIG. 1.

Referring to FIG. 2, the image forming apparatus 300 is comprised of a controller 201, a console section 204, a printer 203, a scanner 202, and a modem 220.

The controller 201 is comprised of a CPU 210, a RAM 211, a ROM 212, a console section interface 213, an image processor 214, a printer interface 215, a scanner interface 216, a LAN interface 217, and a fax interface 219, which are connected by a bus 250.

The CPU 210 controls the overall operation of the image forming apparatus 300. The RAM 211 is a volatile storage device which is used as a work area of the CPU 210, and stores various data. The ROM 212 is a nonvolatile storage device storing e.g. programs executed by the CPU 210. Processes, described hereinafter, are realized by the CPU 210 which executes programs stored in the ROM 212 and loaded into the RAM 211.

The console section interface 213 provides an interface between the controller 201 and the console section 204. The image processor 214 corrects, manipulates, and edits image data, and performs correction, resolution conversion, and so forth, for printing, on image data to be printed.

The printer interface 215 provides an interface between the controller 201 and the printer 203. The scanner interface 216 provides an interface between the controller 201 and the scanner 202.

The LAN interface 217 provides an interface between the controller 201 and the network 304. The fax interface 219 provides an interface between the controller 201 and the modem 220.

The console section 204 displays information for a user and enables the user to perform input operations. The console section 204 will be described in detail hereinafter.

The printer 203 prints an image represented by image data on a recording medium, such as a sheet. Further, the printer 203 includes a cartridge 221, and also a sheet feeder, a printing section, and a sheet discharge section, none of which are shown.

Note that the printing method of the printer 203 may be either of an electrophotographic method and an inkjet method. Further, the printing quality of the printer 203 is adversely affected by various characteristics thereof, and hence the image forming apparatus 300 according to the present embodiment is equipped with an adjustment function for improving the printing quality.

The scanner 202 reads an original using a sensor 218, and outputs image data representing an image of the original. This sensor 218 reads an original set on a platen glass through the platen glass. The CPU 210 can detect soil of the platen glass by analyzing the image data output from the scanner 202. The modem 220 is connected to a public telephone line to transmit a fax document. In the following description, the soil of the platen glass is referred to as soil of the scanner 202, and cleaning of the platen glass as cleaning of the scanner 202.

Out of the processes performed with the above-described configuration, a process for transmitting image data to an external apparatus using the LAN interface 217 is referred to as a send job. Further, a process for transmitting image data to an external apparatus using the fax interface 219 is referred to as a fax job.

Furthermore, a process for reading an original by the scanner 202 and printing an image representing the original by the printer 203 is referred to as a copy job. Further, out of processes for printing by the printer 203, a process other than the copy job is referred to as a print job.

Figure 3:
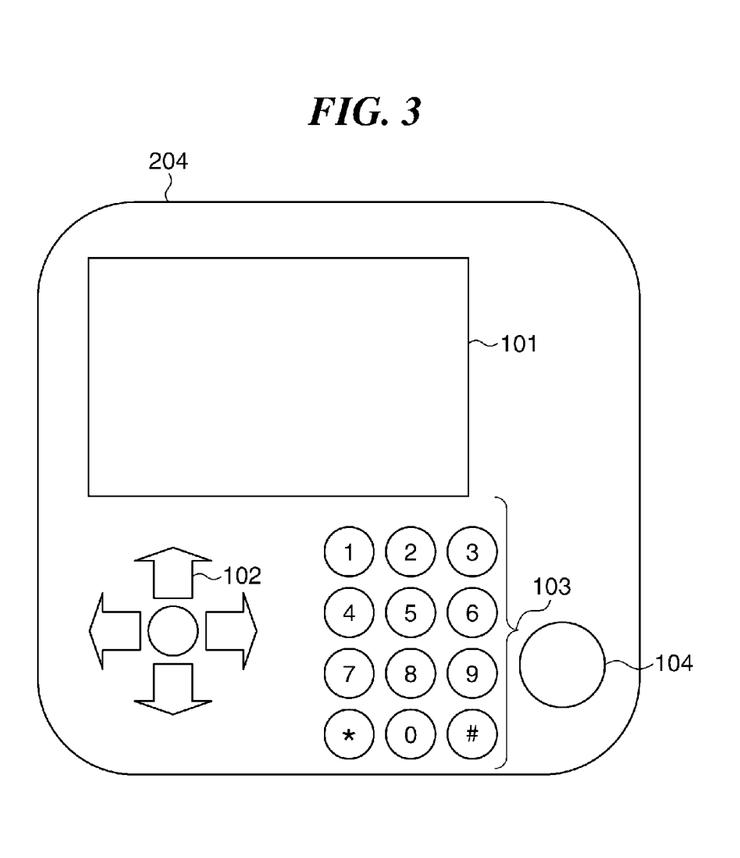
FIG. 3 is a schematic view of a console section appearing in FIG. 2.

FIG. 3 is a schematic diagram of the console section 204 appearing in FIG. 2.

Referring to FIG. 3, the console section 204 includes a display section 101, a cross key 102, a numeric keypad 103, and a start key 104.

The cross key 102 and the numeric keypad 103 are used by the user to select items and make settings. The start key 104 is used by the user to instruct printing and the like. The display section 101 displays various screens, described hereinafter, and various kinds of information.

FIGS. 4A to 4E are diagrams of the screens displayed on the display section 101 appearing in FIG. 3.

Figure 4A:
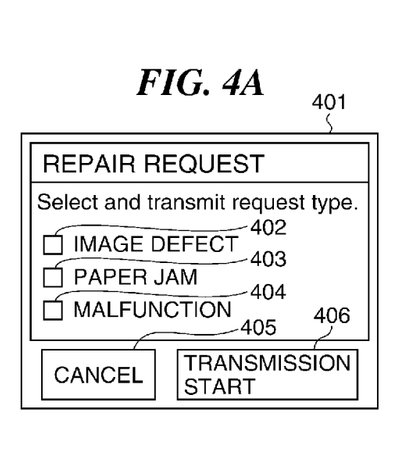
FIGS. 4A to 4E are diagrams of screens displayed on a display section shown in FIG. 3.

FIG. 4A shows a screen 401 which receives a user's instruction for transmitting a request for repairing the image forming apparatus 300 to the management apparatus 301.

A phenomenon occurring in the image forming apparatus 300 is input to the screen 401 by the user. In the present embodiment, an image defect, a paper jam, and a malfunction, will be described as examples of the occurring phenomenon, by way of example.

The image defect 402 is a check box which is selected when an image obtained using the image forming apparatus 300 has some problem.

The paper jam 403 is a check box which is selected when the image forming apparatus 300 suffers from frequent occurrence of paper jams or occurrence of a paper jam which cannot be coped with by the user.

The malfunction 404 is a check box which is selected when the image forming apparatus 300 suffers from some malfunction other than the above-mentioned image defect and paper jam.

If any of the image defect 402, the paper jam 403, and the malfunction 404 is selected, a transmission start button 406 is enabled, whereas if not, the transmission start button 406 remains disabled.

When the transmission start button 406 is depressed by the user, the CPU 210 performs a repair request determination process, described hereinafter, and if it is necessary to transmit the repair request, the CPU 210 transmits the repair request to the management apparatus 301.

Further, a cancel button 405 is depressed when the repair request is to be cancelled. When the cancel button 405 is depressed by the user, the screen 401 is closed.

Figure 4B:
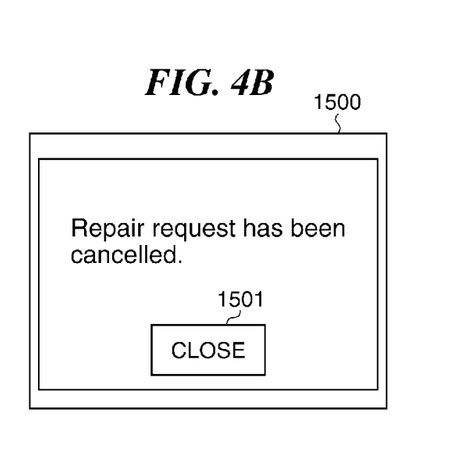

FIG. 4B shows a repair request cancel screen 1500 displayed when the repair request is cancelled.

The repair request cancel screen 1500 shown in FIG. 4B is displayed when the repair request is cancelled. This repair request cancel screen 1500 is closed by depressing a close button 1501.

Figure 4C:
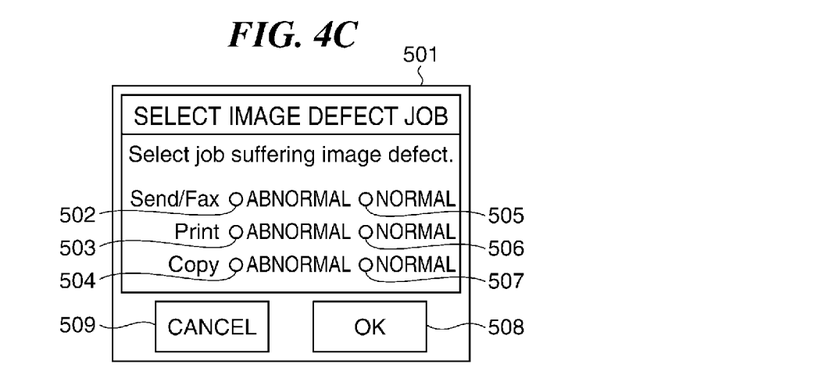

FIG. 4C shows an image defect job selection screen 501 for use in selecting a job which is suffering from an image defect.

On this image defect job selection screen 501, a job suffering from the phenomenon of an image defect is input by the user. In the present embodiment, three jobs, i.e. the send/fax job, the print job, and the copy job will be described as examples of the jobs.

Further, in the present embodiment, the send/fax job is described as an example of a job using only the scanner 202, the print job is described as an example of a job using only the printer 203, and the copy job is described as an example of a job using the scanner 202 and the printer 203.

A radio button 502 is selected when an image defect occurs in the send/fax job. A radio button 505 is selected when no image defect occurs in the send/fax job.

A radio button 503 is selected when an image defect occurs in the print job. A radio button 506 is selected when no image defect occurs in the print job.

A radio button 504 is selected when an image defect occurs in the copy job. A radio button 507 is selected when no image defect occurs in the copy job.

If any of the radio buttons 502, 503, and 504 is selected, an OK button 508 is enabled, whereas if not, the OK button 508 remains disabled.

When the OK button 508 is depressed, the CPU 210 stores information of the job suffering from the image defect, in the RAM 211, and closes the image defect job selection screen 501.

Further, a cancel button 509 is depressed when canceling the selection of a job suffering from the image defect. When the cancel button 509 is depressed by the user, the image defect job selection screen 501 is closed, and the screen 401 is displayed.

Figure 4D:
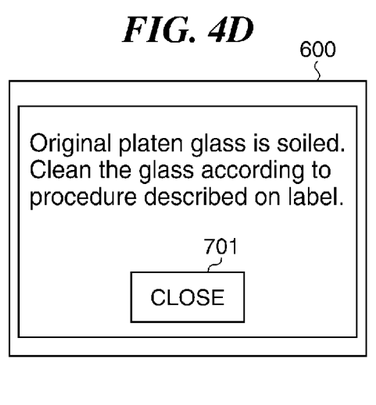

FIG. 4D shows a screen 600 that prompts the user to clean the scanner 202. A close button 601 is a button for closing this screen 600. The screen 600 displays cleaning of the scanner 202 as one of predetermined methods of repair work that can be performed by the user.

Figure 4E:
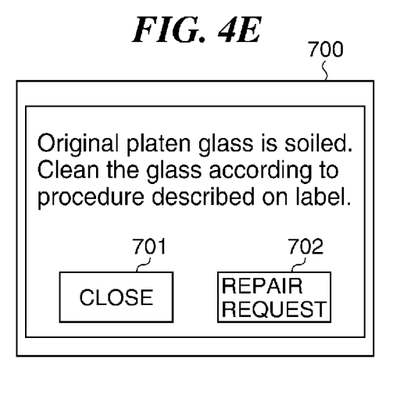

FIG. 4E shows a screen 700 that not only prompts the user to clean the scanner 202, but also displays a repair request button 702. On the screen 700, by using the repair request button 702, it is possible to request repair of the image forming apparatus 300. A close button 701 is a button for closing the screen 700.

FIGS. 5A to 5D show screens displayed on the display section 101 appearing in FIG. 3.

Figure 5A:
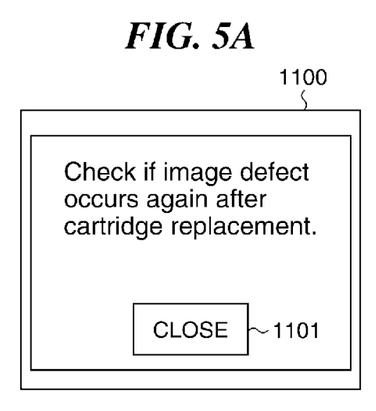
FIGS. 5A to 5D are diagrams of screens displayed on the display section shown in FIG. 3.

FIG. 5A shows a screen 1100 that prompts the user to replace the cartridge 221 of the printer 203. A close button 1101 is a button for closing this screen 1100. The screen 1100 displays replacement of the cartridge 221 as one of the predetermined methods of repair work that can be performed by the user.

Figure 5B:
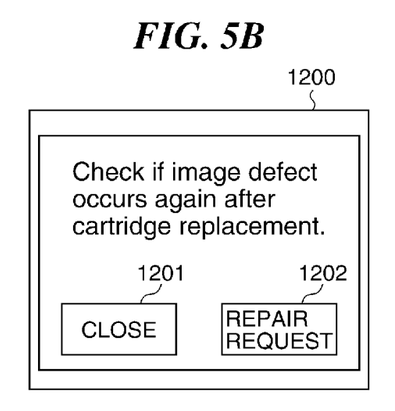

FIG. 5B shows a screen 1200 that not only prompts the user to replace the cartridge 221 of the printer 203, but also displays a repair request button 1202. On this screen 1200, by using the repair request button 1202, it is possible to request repair of the image forming apparatus 300. A close button 1201 is a button for closing the screen 1200.

Figure 5C:
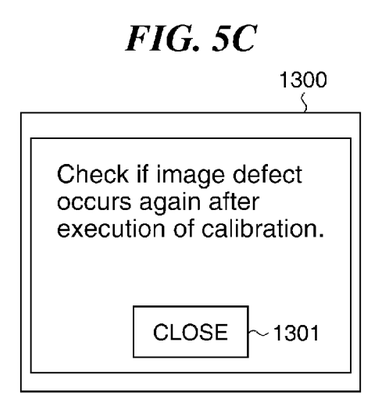

FIG. 5C shows a screen 1300 that prompts the user to execute the calibration . A close button 1301 is a button for closing this screen 1300. The screen 1300 displays execution of the calibration as one of the predetermined methods of repair work that can be performed by the user.

Figure 5D:
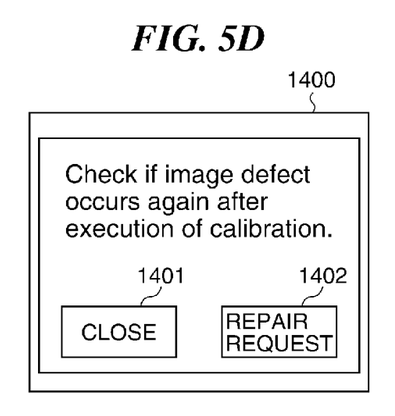

FIG. 5D shows a screen 1400 that not only prompts the user to cause execution of the calibration, but also displays a repair request button 1402. On this screen 1400, by using the repair request button 1402, it is possible to request repair of the image forming apparatus 300. A close button 1401 is a button for closing the screen 1400.

Out of the screens described above, the screens shown in FIGS. 4D, 5A, and 5C are each an operation screen displayed, when the instruction is received, to show a repair operation that the user should perform. Further, the screens shown in FIGS. 4E, 5B, and 5D are each also an operation screen. From the operation screens shown in FIGS. 4E, 5B, and 5D are used, when the instruction for transmitting the repair request to the management apparatus 301 is received from the user again, the repair request is transmitted to the management apparatus 301. Note that the repair request buttons correspond to a reception section.

Figure 6:
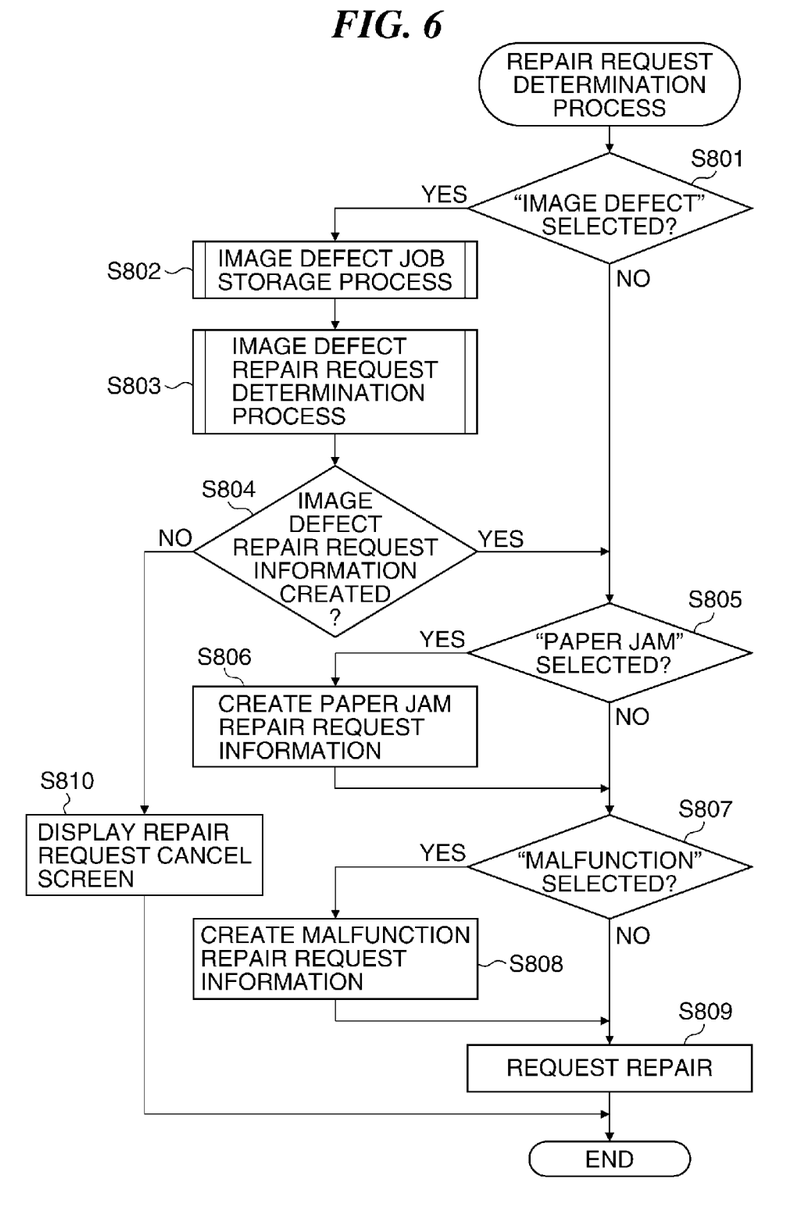
FIG. 6 is a flowchart of a repair request determination process performed by a CPU appearing in FIG. 2.

FIG. 6 is a flowchart of the repair request determination process performed by the CPU 210 shown in FIG. 2.

The repair request determination process shown in FIG. 6 is performed when one of the image defect 402, the paper jam 403, and the malfunction 404 is selected on the screen shown in FIG. 4A, and the transmission start button 406 is depressed.

Referring to FIG. 6, it is determined whether or not the image defect 402 is selected (step S801). If it is determined in the step S801 that the image defect 402 is not selected (NO to the step S801), the process proceeds to a step S805.

On the other hand, if it is determined in the step S801 that the image defect 402 is selected (YES to the step S801), an image defect job storage process is performed for storing a job in which the image defect has occurred (step S802), and then an image defect repair request determination process is performed for creating image defect repair request information as required (step S803).

Then, it is determined whether or not the image defect repair request information has been created (step S804). If it is determined in the step S804 that the image defect repair request information has not been created (NO to the step S804), the repair request cancel screen 1500 described with reference to FIG. 4B is displayed (step S810), followed by terminating the present process.

On the other hand, if it is determined in the step S804 that the image defect repair request information has been created (YES to the step S804), it is determined whether or not the paper jam 403 is selected (step S805).

If it is determined in the step S805 that the paper jam 403 is selected (YES to the step S805), paper jam repair request information is created (step S806), and the process proceeds to a step S807.

On the other hand, if it is determined in the step S805 that the paper jam 403 is not selected (NO to the step S805), the process proceeds to the step S807, wherein it is determined whether or not the malfunction 404 is selected.

If it is determined in the step S807 that the malfunction 404 is selected (YES to the step S807), malfunction repair request information is created (step S808), and the process proceeds to a step S809.

On the other hand, if it is determined in the step S807 that the malfunction 404 is not selected (NO to the step S807), the process proceeds to the step S809, wherein the CPU 201 makes a repair request by transmitting the created one of the image defect repair request information, the paper jam repair request information, and the malfunction repair request information, to the management apparatus 301, followed by terminating the present process.

Figure 7:
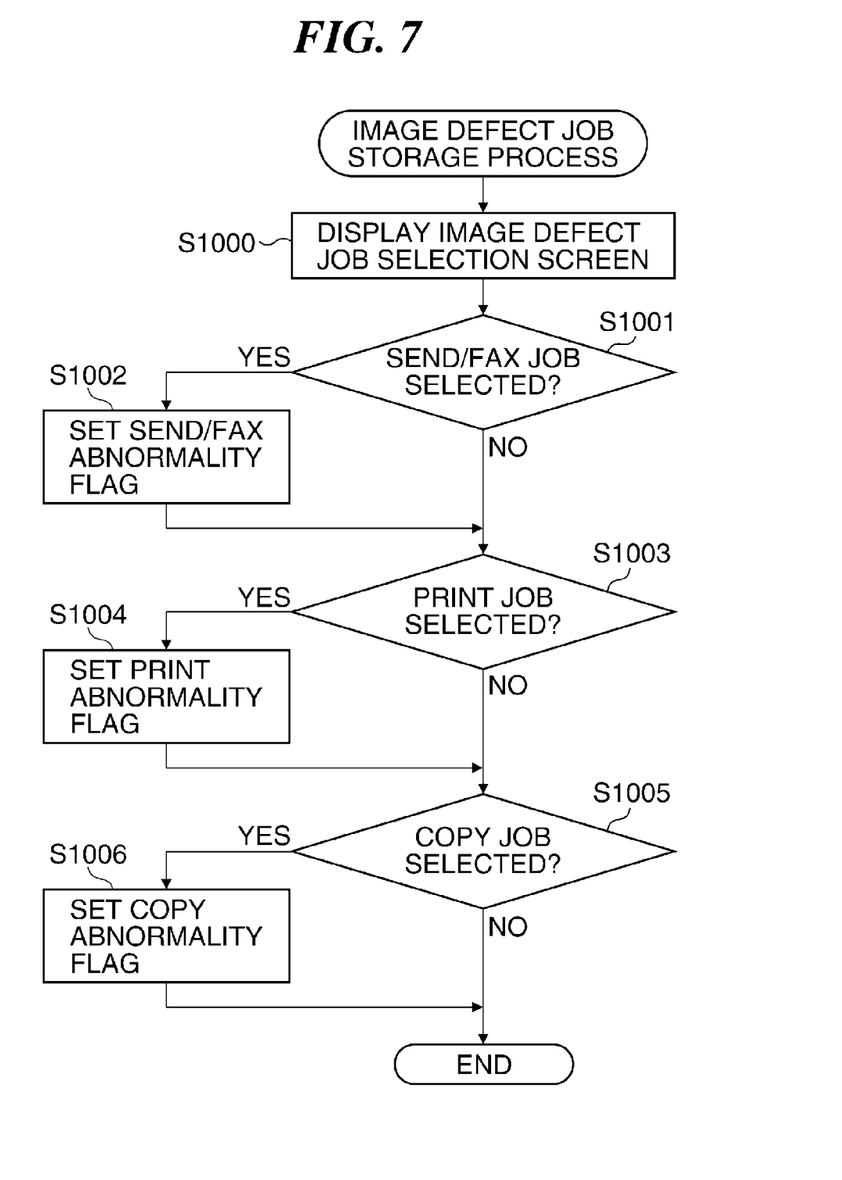
FIG. 7 is a flowchart of an image defect job storage process performed in a step in FIG. 6.

FIG. 7 is a flowchart of the image defect job storage process performed in the step S802 in FIG. 6.

In the following description of the image defect job storage process shown in FIG. 7, it is assumed that the image defect job selection screen 501 described with reference to FIG. 4C is displayed (step S1000), one of the radio buttons 502, 503, and 504 is selected, and the OK button 508 is depressed. Although the screen 401 in FIG. 4A is displayed if the cancel button 509 is depressed, it is assumed that the OK button 508 is depressed, for the sake of simplicity.

Then, it is determined whether or not the send/fax job associated with the radio button 502 is selected as an abnormal job (step S1001).

If it is determined in the step S1001 that the send/fax job is not selected (NO to the step S1001), the process proceeds to a step S1003, whereas if it is determined in the step S1001 that the send/fax job is selected (YES to the step S1001), a send/fax abnormality flag is set (step S1002).

Next, it is determined whether or not the print job associated with the radio button 503 is selected as an abnormal job (step S1003).

If it is determined in the step S1003 that the print job is not selected (NO to the step S1003), the process proceeds to a step S1005, whereas if it is determined in the step S1003 that the print job is selected (YES to the step S1003), a print abnormality flag is set (step S1004).

Then, it is determined whether or not the copy job associated with the radio button 504 is selected as an abnormal job (step S1005).

If it is determined in the step S1005 that the copy job is not selected (NO to the step S1005), the present process is terminated, whereas if it is determined in the step S1005 that the copy job is selected (YES to the step S1005), a copy abnormality flag is set (step S1006), followed by terminating the present process.

In the following description, the send/fax abnormality flag, the print abnormality flag, and the copy abnormality flag are each sometimes generically referred to as the abnormality flag. Further, these abnormality flags are stored in the RAM 211.

FIGS. 8A to 8D are a flowchart of the image defect repair request determination process in the step S803 in FIG. 6.

Figure 8A:
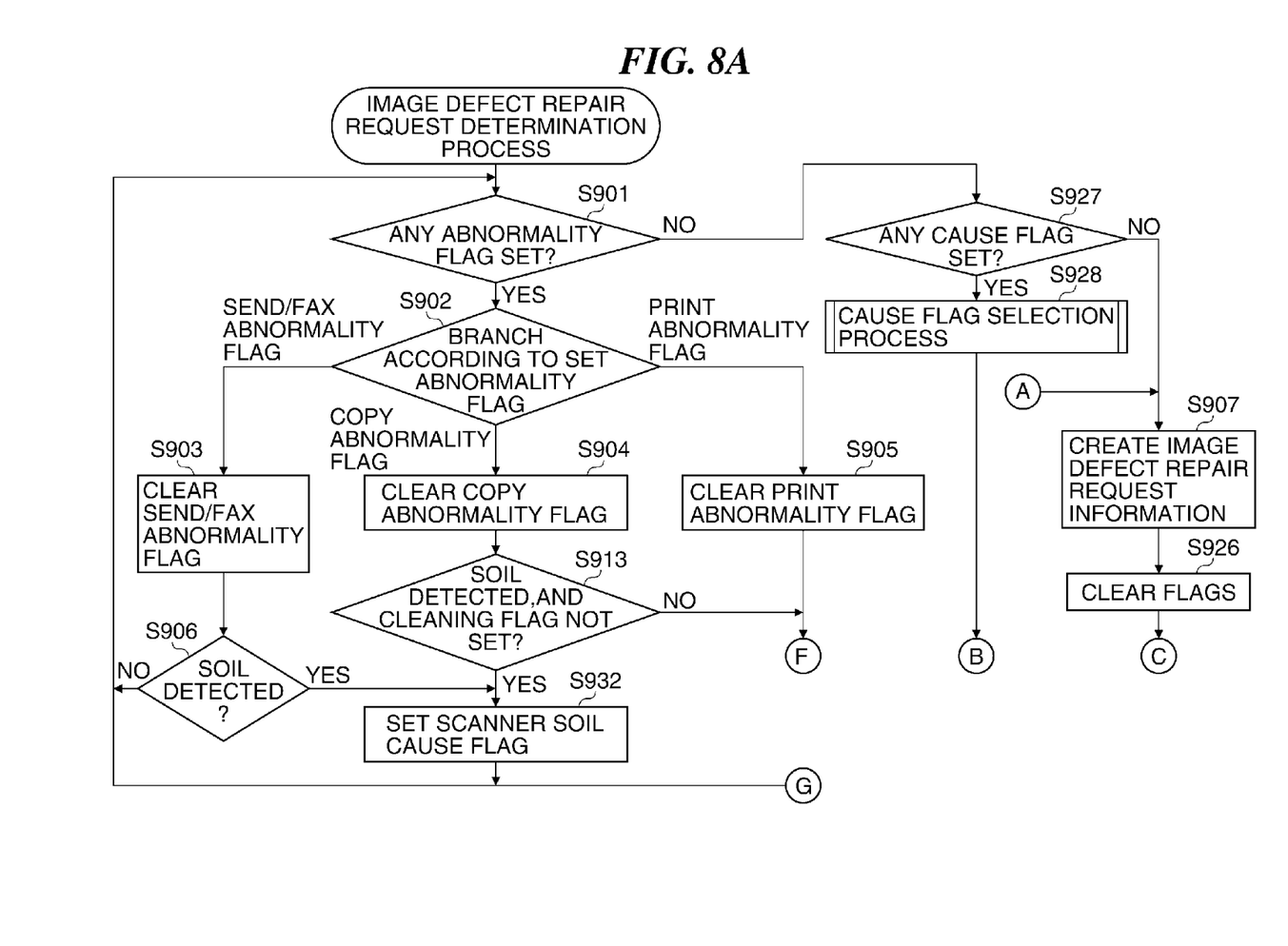
FIG. 8A is a flowchart of an image defect repair request determination process in a step in FIG. 6.

Referring to FIG. 8A, it is determined whether or not there is any abnormality flag set by the image defect job storage process in FIG. 7 (step S901).

If it is determined in the step S901 that there is any abnormality flag set by the image defect job storage process in FIG. 7 (YES to the step S901), the process branches according to the set abnormality flag (step S902).

If it is determined in the step S902 that the send/fax abnormality flag is set, the send/fax abnormality flag is cleared (step S903), and then it is determined whether or not soil of the scanner 202 has been detected (step S906).

This is because it is presumed that the image defect of the send/fax job has been caused by reading of the scanner. When the soil of the scanner 202 has been detected, it is considered that the image defect has been caused by the soil. Therefore, when "abnormality" (radio button) of the send/fax job has been selected, whether or not to transmit the repair request is determined depending on whether or not the soil of the scanner 202 has been detected.

If it is determined in the step S906 that the soil of the scanner 202 has not been detected (NO to the step S906), the process returns to the step S901.

On the other hand, if it is determined in the step S906 that the soil of the scanner 202 has been detected (YES to the step S906), a scanner soil cause flag is set (step S932), and the process returns to the step S901. The scanner soil cause flag is set if there is a possibility that the image defect has been caused by the soil of the scanner 202, whereas if not, it is not set.

Referring again to the step S902, if it is determined in the step S902 that the copy abnormality flag is set, the copy abnormality flag is cleared (step S904), and it is determined whether or not the soil of the scanner 202 has been detected, and whether or not a cleaning flag is not set (step S913).

The cleaning flag is set when the user is prompted to clean the scanner 202, whereas otherwise, it is not set. Further, since in the copy job, the original is scanned and printing is performed, the image defect may have been caused by the scanner 202 or the printer 203. In view of this, it is determined whether or not the image defect has been caused by the scanner 202 or the printer 203 by checking whether or not the soil of the scanner 202 has been detected and whether or not the cleaning flag is not set.

If it is determined in the step S913 that the soil of the scanner 202 has been detected and the cleaning flag is not set (YES to the step S913), the process proceeds to the above-mentioned step 932.

Figure 8B:
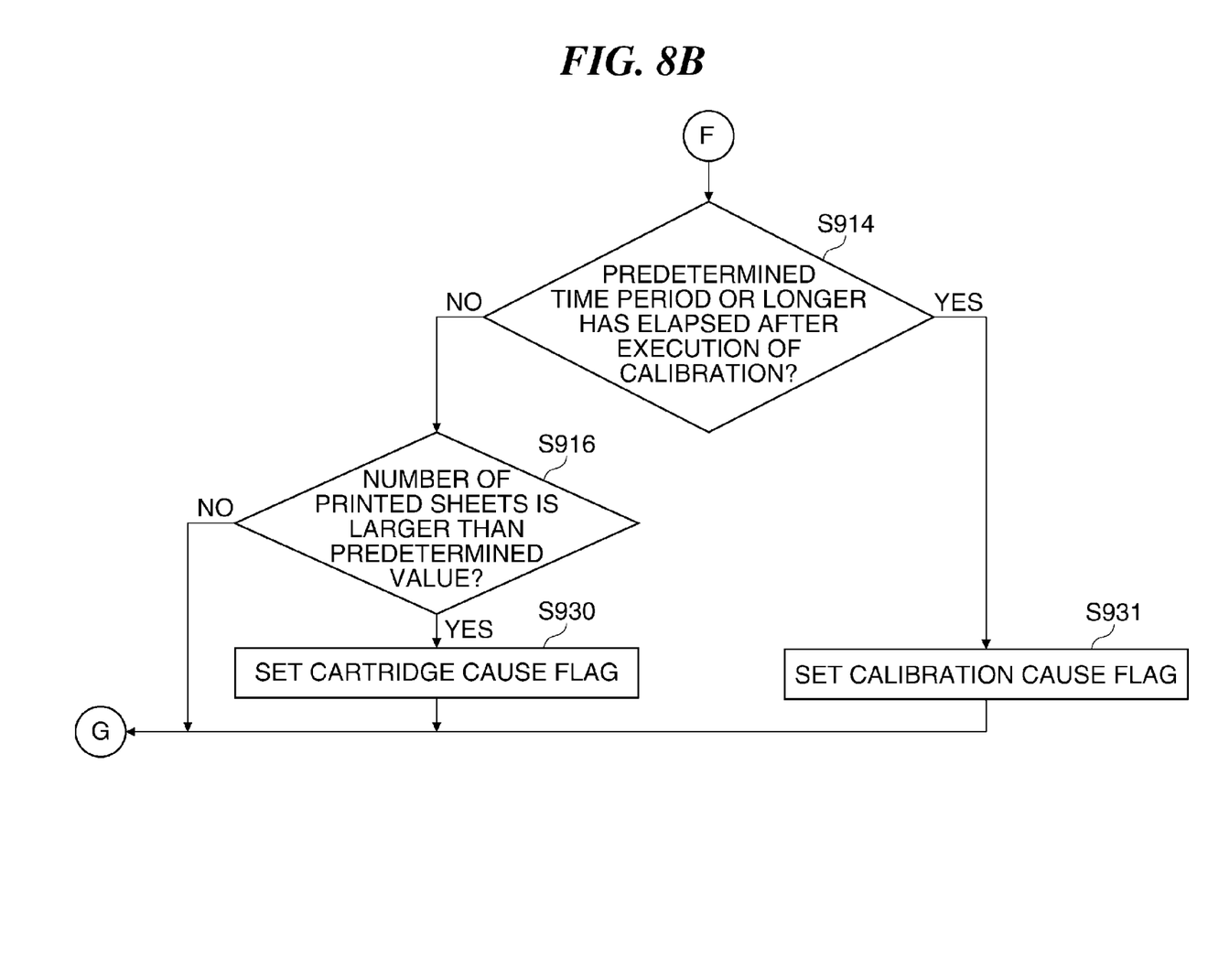
FIG. 8B is a continuation of FIG. 8A.

On the other hand, if it is determined in the step S913 that the soil of the scanner 202 has not been detected or the cleaning flag is set (NO to the step S913), the process proceeds to a step S914 in 8B.

Referring again to the step S902, if it is determined that the print abnormality flag is set, the print abnormality flag is cleared (step S905), and it is determined whether or not a predetermined time period or longer has elapsed after execution of the calibration (step S914).

If it is determined in the step S914 that the predetermined time period or longer has elapsed after execution of the calibration (YES to the step S914), there is a possibility that the image defect can be solved by execution of the calibration, and hence a calibration cause flag is set (step S931), and the process returns to the step S901. The calibration cause flag is set when there is a possibility that non-execution of the calibration is a cause of the image defect, whereas otherwise, it is not set.

On the other hand, if it is determined in the step S914 that the predetermined time period or longer has not elapsed after execution of the calibration (NO to the step S914), it is determined whether or not the number of sheets printed after replacement of the cartridge is larger than a predetermined value (step S916).

If it is determined in the step S916 that the number of sheets printed after replacement of the cartridge is not larger than the predetermined value (NO to the step S916), the process returns to the step S901.

On the other hand, if it is determined in the step S916 that the number of sheets printed after replacement of the cartridge is larger than the predetermined value (YES to the step S916), there is a possibility that the image defect can be solved by replacement of the cartridge, so that a cartridge cause flag is set (step S930), and the process returns to the step S901.

The cartridge cause flag is set when there is a possibility that the cartridge is a cause of the image defect, whereas otherwise, it is not set.

In the following description, the scanner soil cause flag, the calibration cause flag, and the cartridge cause flag are each sometimes generically referred to as the cause flag. Further, in the image defect repair request determination process, in addition to these cause flags, a cartridge change flag and a calibration flag are used.

Out of these, the cartridge change flag is used when the user is prompted to replace the cartridge. Further, the calibration flag is used when the user is prompted to execute the calibration.

Referring again to the step S901, if it is determined that there is no set abnormality flag (NO to the step S901), it is determined whether or not there is any set cause flag (step S927).

Figure 8C:
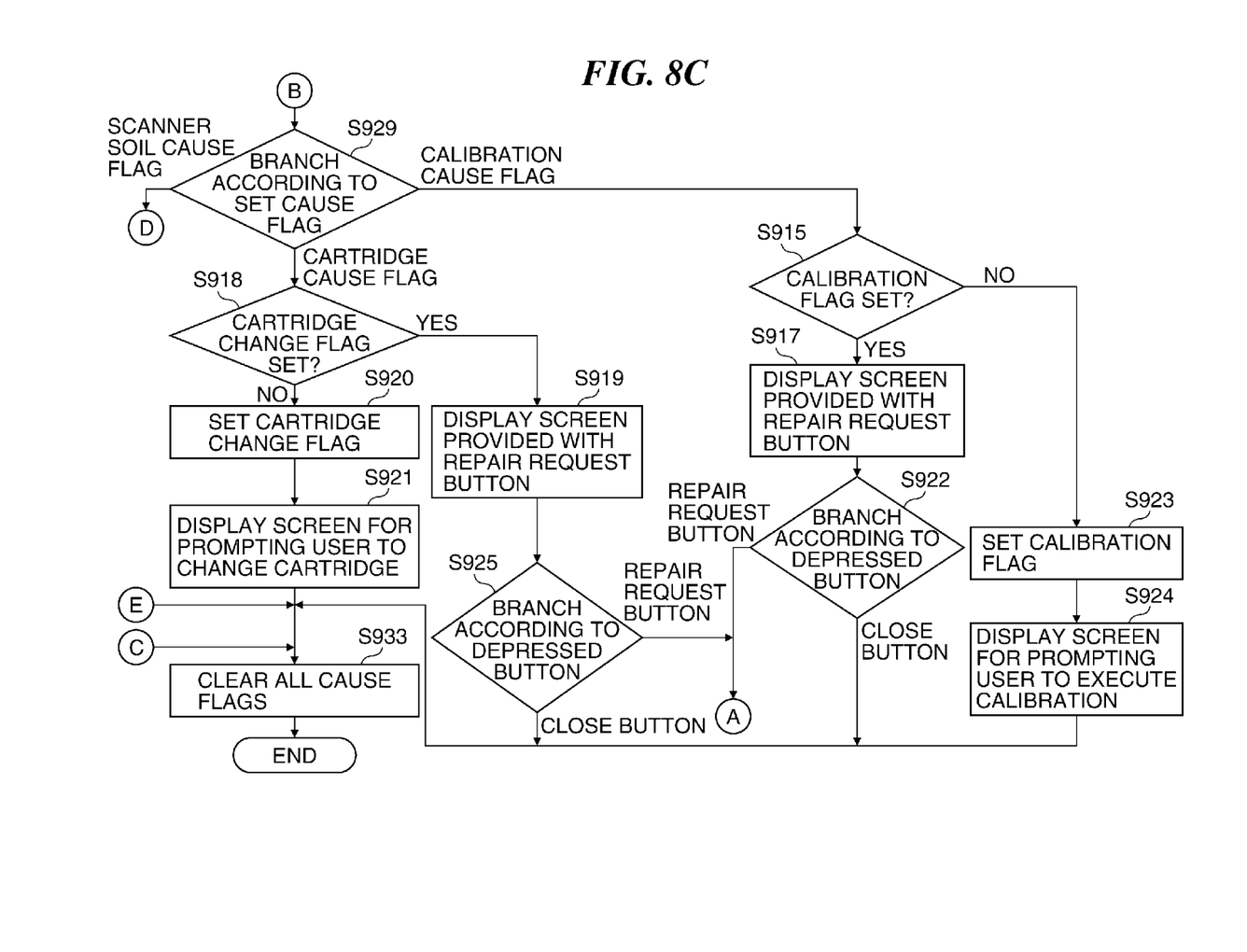
FIG. 8C is a continuation of FIG. 8A.

If it is determined in the step S927 that there is any set cause flag (YES to the step S927), a cause flag selection process for selecting an item of confirmation operation which the user is to be prompted to perform (step S928), and the process proceeds to a step S929 in FIG. 8C.

On the other hand, if it is determined in the step S927 that there is no set cause flag (NO to the step S927), image defect repair request information is created (step S907). Then, the cleaning flag, the cartridge change flag, and the calibration flag are cleared (step S926), and the process proceeds to a step S933 in FIG. 8C.

From the step S929 in FIG. 8C, the process branches according to a set cause flag. If it is determined in the step S929 that the scanner soil cause flag is set, the process proceeds to a step S908 in FIG. 8D, wherein it is determined whether or not the cleaning flag is set.

Figure 8D:
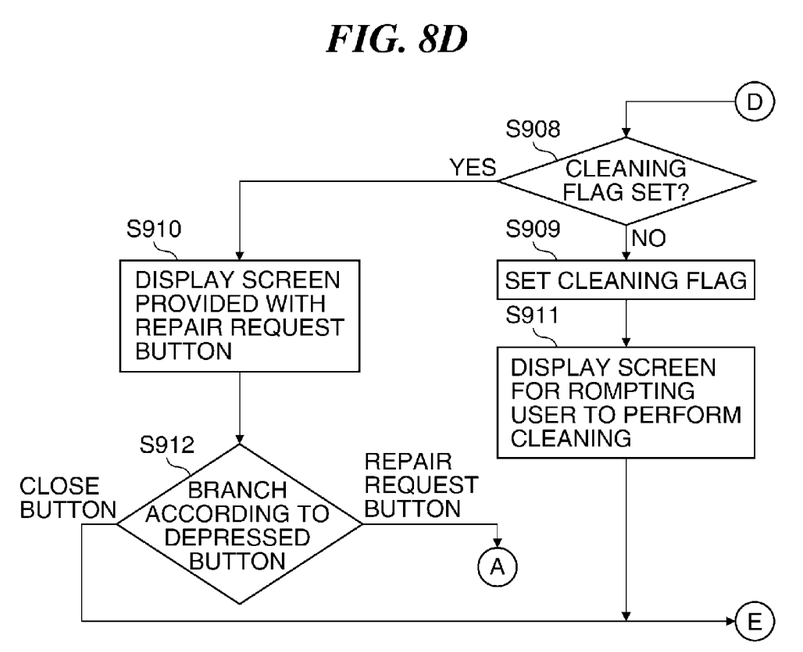
FIG. 8D is a continuation of FIG. 8C.

If it is determined in the step S908 that the cleaning flag is set (YES to the step S908), the FIG. 4E screen 700 provided with the repair request button 702 is displayed (step S910).

Then, the process branches according to a button depressed on the screen 700 (step S912). If it is determined in the step S912 that the close button 701 has been depressed, all the cause flags are cleared in the step S933 in FIG. 8C, followed by terminating the present process.

On the other hand, if it is determined in the step S912 that the repair request button 702 has been depressed, the process proceeds to the step S907 in FIG. 8A.

Referring again to the step S908, if it is determined that the cleaning flag is not set (NO to the step S908), the cleaning flag is set (step S909), and the FIG. 4D screen 600 for prompting the user to clean the scanner 202 is displayed (S911). Then, the process proceeds to the above-mentioned step S933.

Referring again to the step S929 in FIG. 8C, if it is determined that the cartridge cause flag is set, it is determined whether or not the cartridge change flag is set (step S918).

If it is determined in the step S918 that the cartridge change flag is not set (NO to the step S918), the cartridge change flag is set (step S920), and the FIG. 5A screen 1100 for prompting the user to replace the cartridge is displayed (step S921). Then, the process proceeds to the above-mentioned step S933.

On the other hand, if it is determined in the step S918 that the cartridge change flag is set (YES to the step S918), the FIG. 5B screen 1200 provided with the repair request button 1202 is displayed (step S919).

Then, the process branches according to a button depressed on the screen 1200 (step S925). If it is determined in the step S925 that the close button 1201 has been depressed, the process proceeds to the above-mentioned step S933.

On the other hand, if it is determined in the step S925 that the repair request button 1202 has been depressed, the process proceeds to the step S907 in FIG. 8A.

Referring again to the step S929, if it is determined in the step S929 that the calibration cause flag is set, it is determined whether or not the calibration flag is set (step S915).

If it is determined in the step S915 that the calibration flag is set (YES to the step S915), the FIG. 5D screen 1400 provided with the repair request button 1402 is displayed (step S917).

Next, the process branches according to a button depressed on the screen 1400 (step S922). If it is determined in the step S922 that the close button 1401 has been depressed, the process proceeds to the above-mentioned step S933.

On the other hand, if it is determined in the step S922 that the repair request button 1402 has been depressed, the process proceeds to the step S907 in FIG. 8A.

Referring again to the step S915, if it is determined that the calibration flag is not set (NO to the step S915), the calibration flag is set (step S923), and the FIG. 5C screen 1300 for prompting the user to execute the calibration is displayed (step S924). Then, the process proceeds to the above-mentioned step S933.

By executing the above-described image defect repair request determination process, a repair operation to be displayed on an operation screen is determined from a plurality of repair operations based on a type of the repair request and the state of the image forming apparatus. Further, as described with reference to FIGS. 8C and 8D, a repair operation associated with a selected job type is displayed.

Figure 9:
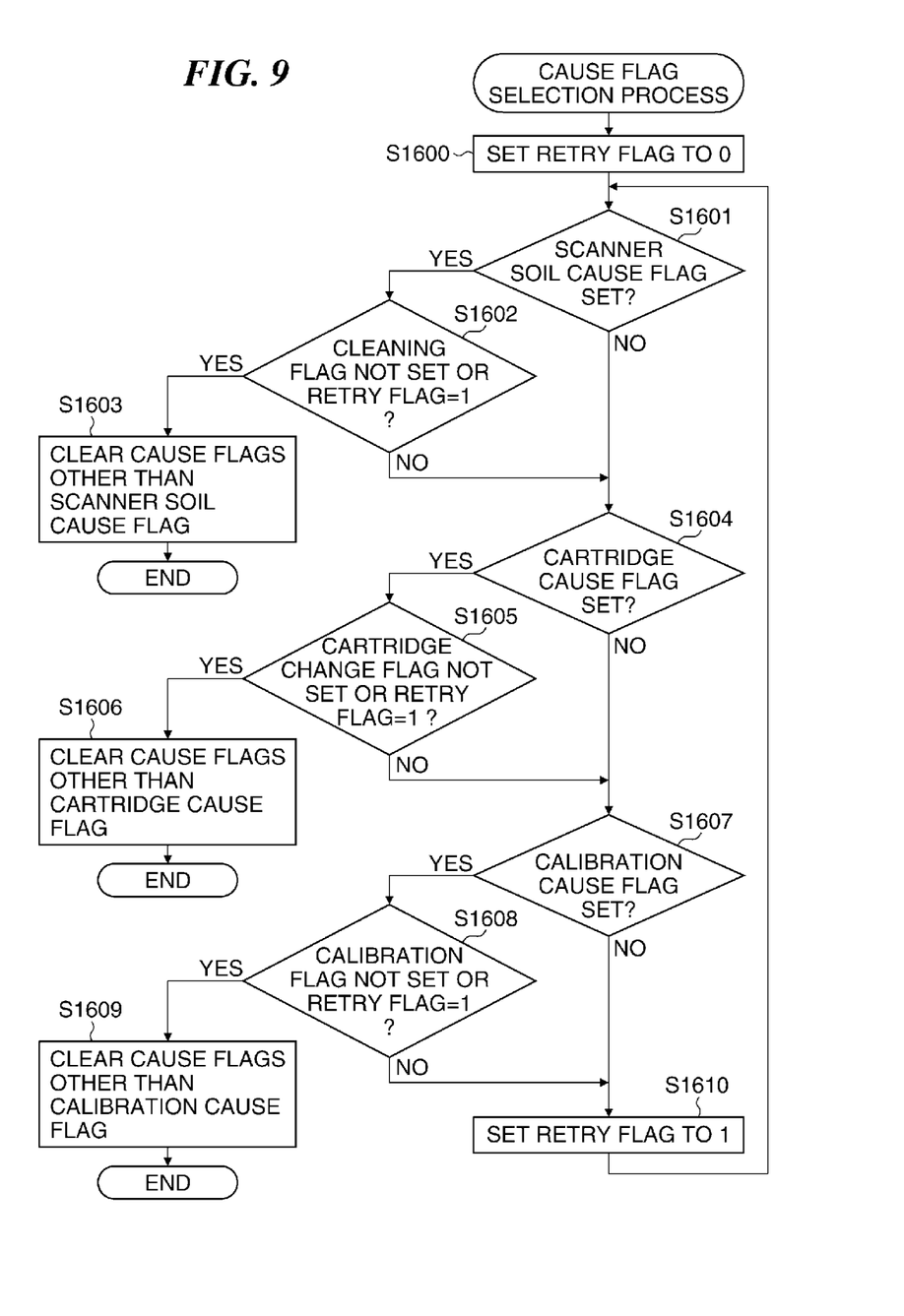
FIG. 9 is a flowchart of a cause flag selection process performed in a step in FIG. 8A.

FIG. 9 is a flowchart of the cause flag selection process performed in the step S928 in FIG. 8A.

Referring to FIG. 9, a retry flag is set to 0 (step S1600). The retry flag is used for selecting a cause flag.

Then, it is determined whether or not the scanner soil cause flag is set (step S1601). If it is determined in the step S1601 that the scanner soil cause flag is not set (NO to the step S1601), the process proceeds to a step S1604.

On the other hand, if it is determined in the step S1601 that the scanner soil cause flag is set (YES to the step S1601), it is determined whether or not the cleaning flag is not set, or the retry flag is equal to 1 (step S1602).

If it is determined in the step S1602 that the cleaning flag is not set, or the retry flag is equal to 1 (YES to the step S1602), the cause flags other than the scanner soil cause flag are cleared (step S1603), followed by terminating the present process.

On the other hand, if it is determined in the step S1602 that the cleaning flag is set and also the retry flag is equal to 0 (NO to the step S1602), it is determined whether or not the cartridge cause flag is set (step S1604). If it is determined in the step S1604 that the cartridge cause flag is not set (NO to the step S1604), the process proceeds to a step S1607.

On the other hand, if it is determined in the step S1604 that the cartridge cause flag is set (YES to the step S1604), it is determined whether or not the cartridge change flag is not set, or the retry flag is equal to 1 (step S1605).

If it is determined in the step S1605 that the cartridge change flag is not set, or the retry flag is equal to 1 (YES to the step S1605), the cause flags other than the cartridge cause flag are cleared (step S1606), followed by terminating the present process.

On the other hand, if it is determined in the step S1605 that the cartridge change flag is set, and also the retry flag is equal to 0 (NO to the step S1605), it is determined whether or not the calibration cause flag is set (step S1607). If it is determined in the step S1607 that the calibration cause flag is not set (NO to the step S1607), the process proceeds to a step S1610.

On the other hand, if it is determined in the step S1607 that the calibration cause flag is set (YES to the step S1607), it is determined whether or not the calibration flag is not set, or the retry flag is equal to 1 (step S1608).

If it is determined in the step S1608 that the calibration flag is not set, or the retry flag is equal to 1 (YES to the step S1608), the cause flags other than the calibration cause flag are cleared (step S1609), followed by terminating the present process.

On the other hand, if it is determined in the step S1608 that the calibration flag is set, and also the retry flag is set to 0 (NO to the step S1608), the retry flag is set to 1 (step S1610), and the process returns to the step S1601.

Next, the processes described above with reference to the flowcharts will be explained based on examples.

When making a repair request due to an image defect occurring during the send job, the user operates the console section 204, whereby the CPU 210 displays the screen 401 shown in FIG. 4A.

Since the user requests repair concerning an image defect, the user selects the image defect 402, and depresses the transmission start button 406. When the transmission start button 406 is depressed, the repair request determination process shown in FIG. 6 is performed by the CPU 210.

In this case, since the image defect 402 is selected by the user, the step S1000 is executed, whereby the image defect job selection screen 501 shown in FIG. 4C is displayed.

Here, let it be assumed that the user selects the radio button 502 associated with the send/fax job and depresses the OK button 508.

In this case, the image defect job storage process shown in FIG. 7 is performed by the CPU 210, whereby the send/fax abnormality flag is set in the step S1002. Then, the image defect repair request determination process is performed in the step S803.

In this case, since the send/fax abnormality flag is set, it is determined in the step S906 in FIG. 8 whether or not soil of the scanner 202 has been detected.

If the soil of the scanner 202 has been detected, there is a possibility that the image defect has been caused by noise generated by the soil, so that the repair request is not made, but the FIG. 4D screen 600 for prompting the user to clean the scanner 202 is displayed in the step S911.

With this, if the user's cleaning operation improves the image defect, it becomes unnecessary to make a wasteful repair request. On the other hand, to enable the user to make a repair request when the soil of the scanner 202 is detected in the step S906 and the image defect is not improved by the user's cleaning operation, the cleaning flag is set in the step S909 before displaying the FIG. 4D screen 600.

If the cleaning flag has been set, the process proceeds to the step S910 from the step S908, wherein the FIG. 4E screen 700 provided with the repair request button 702 is displayed. This enables the user to make a repair request.

According to the present embodiment, it is possible to prevent an unnecessary repair request from being made, by checking the state of the image forming apparatus 300 before transmitting a repair request to the management apparatus 301, displaying a check item, if any, which may be a cause of an image defect repairable by the user, and stopping making an actual repair request if the image defect can be repaired by the user. Further, by displaying only a check item associated with the image defect, it is possible to reduce labor on the user who performs a checking/repair operation.

As described heretofore, according to the present embodiment, information on a phenomenon (FIG. 4A) occurring in the image forming apparatus 300 is input, image processing (FIG. 4C) that causes the phenomenon is input, a screen (FIGS. 4D, 5A, and 5C) is displayed which prompts the user to perform repair work by a predetermined method that can be performed by the user, based on the first-time input phenomenon as the input phenomenon and the first-time input image processing as the input image processing, and after that, a screen (FIGS. 4E, 5B, and 5D) for transmitting a repair request to the management apparatus is displayed when the first-time input phenomenon and the first-time input image processing are input again.

As shown in FIGS. 4A to 4E, and FIGS. 5A to 5D, the user input screens are easy to operate, and hence it is possible to save the user time and effort in making a repair request. Further, since the repair request buttons are not displayed first, but are displayed after the user is prompted to perform repair work by a method executable by the user, it is possible to suppress an unnecessary repair request.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-251139 filed Dec. 4, 2013 which is hereby incorporated by reference herein in its entirety.

What is claimed is:

1. An image forming apparatus that is capable of communicating with an external apparatus via a network, comprising:
   a reception unit configured to receive from a user an instruction for transmitting a repair request for repairing the image forming apparatus to the external apparatus;
   a determination unit configured to determine, when said reception unit receives the instruction from the user, a specific repair operation that the user should perform from among a plurality of repair operations, based on a state of the image forming apparatus;
   a display unit configured to display a notification screen for notifying the user of the specific repair operation determined by said determination unit, wherein the notification screen displays not only the specific repair operation but also a transmission button for transmitting the repair request to the external apparatus; and
   a transmission unit configured to transmit the repair request to the external apparatus, when the transmission button displayed on said display unit is depressed by the user.

2. The image forming apparatus according to claim 1, wherein when the repair request received by said reception unit is a request for solving an image defect occurring in the image forming apparatus, said display unit displays a selection screen for the user to select a job type suffering from the image defect, and wherein the notification screen displays a repair operation associated with the job type selected on the selection screen.

3. The image forming apparatus according to claim 1, wherein the plurality of repair operations include at least cleaning of a platen.

4. The image forming apparatus according to claim 1, wherein the plurality of repair operations include at least replacement of a cartridge.

5. The image forming apparatus according to claim 1, wherein the plurality of repair operations include at least execution of calibration.

6. A method of controlling an image forming apparatus that is capable of communicating with an external apparatus via a network, comprising:

receiving from a user an instruction for transmitting a repair request for repairing the image forming apparatus to the external apparatus;

determining, when the instruction is received from the user, a specific repair operation that the user should perform from among a plurality of repair operations, based on a state of the image forming apparatus;

displaying a notification screen for notifying the user of the determined specific repair operation, wherein the notification screen displays not only the specific repair operation but also a transmission button for transmitting the repair request to the external apparatus; and transmitting the repair request to the external apparatus, when the displayed transmission button is depressed by the user.

7. The method according to claim 6, wherein said displaying includes displaying a selection screen for the user to select a job type suffering from the image defect, when the repair request received by said receiving is a request for solving an image defect occurring in the image forming apparatus, and wherein the notification screen displays a repair operation associated with the job type selected on the selection screen.

8. A non-transitory computer-readable storage medium storing a computer-executable program for executing a method of controlling an image forming apparatus that is capable of communicating with an external apparatus via a network, wherein the method comprises:

receiving from a user an instruction for transmitting a repair request for repairing the image forming apparatus to the external apparatus;

determining, when the instruction is received from the user, a specific repair operation that the user should perform from among a plurality of repair operations, based on a state of the image forming apparatus;

displaying a notification screen for notifying the user of the determined specific repair operation, wherein the notification screen displays not only the specific repair operation but also a transmission button for transmitting the repair request to the external apparatus; and transmitting the repair request to the external apparatus, when the displayed transmission button is depressed by the user.

* * * * *